MECHANISM FOR ROTATING ELECTRICAL UNITS

Filed Nov. 28, 1956 2 Sheets-Sheet 1

INVENTOR.
Jules Medow
BY [signature]
ATTORNEY.

Jan. 6, 1959 J. MEDOW 2,867,489

MECHANISM FOR ROTATING ELECTRICAL UNITS

Filed Nov. 28, 1956 2 Sheets-Sheet 2

INVENTOR.
Jules Medow
BY [signature]
ATTORNEY 2,867,489
Patented Jan. 6, 1959

1

2,867,489

MECHANISM FOR ROTATING ELECTRICAL UNITS

Jules Medow, Los Angeles, Calif., assignor to Radio Corporation of America, a corporation of Delaware Application November 28, 1956, Serial No. 624,927

9 Claims. (Cl. 312—323)

This invention relates to mounting mechanisms for various electrical units, such as oscillators, amplifiers, and similar equipment, and particularly to an economical mounting which permits the units to be rapidly rotated to provide access to the various elements of the electrical units and their wiring.

In Singer Patent No. 2,486,764, of November 1, 1949, one type of rotatable electrical unit mounting is disclosed and claimed, and another type of rotatable mounting mechanism is disclosed in copending application, Serial No. 559,239, filed January 16, 1956, and assigned to the same assignee. The present invention, however, is more of the type of rotatable mounting mechanism shown in copending application, Serial No. 624,928, filed November 28, 1956, and also assigned to the same assignee. This invention utilizes a single slotted plate and pin combination which eliminates previously used multiple grooved plates. The plates may thus be more economically manufactured. Another feature is in the configuration of the groove or slot in each plate which urges and maintains the chassis in locked position on its supports when the chassis is in its operative position in the rack.

The principal object of the invention, therefore, is to facilitate the mounting, dismounting, inspection, and repair of electrical rack-mounted units.

Another object of the invention is to provide an improved rotatable mounting construction for rack-mounted electrical units.

A further object of the invention is to provide an improved rotating mechanism which is simple and economical to construct and which is rapidly attachable to existing electrical units and standard rack equipment.

A still further object of the invention is to provide simple attachments or adjuncts to electrical units and their supports to permit rapid rotation of the units, rapid removal of the units from their supports, and the rapid replacement thereof in the racks.

A better understanding of this invention may be had from the following detailed description when read in connection with the accompanying drawings, in which.

Figures 1, 2:
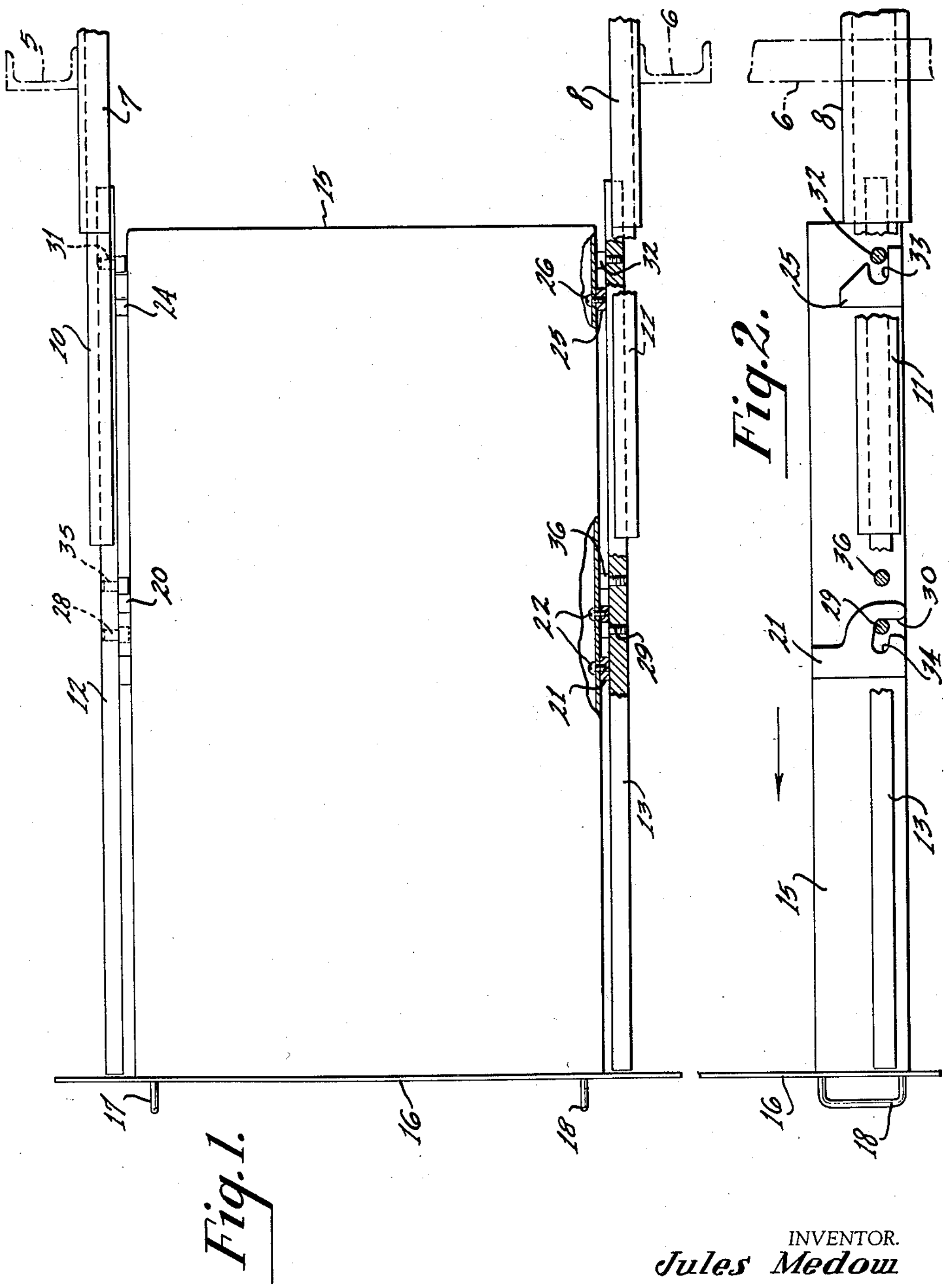
Fig. 1 is a plan view showing an electrical unit mounting embodying the invention.
Fig. 2 is a side elevational view showing the unit of Fig. 1 in unlocked position.
Figure 3:
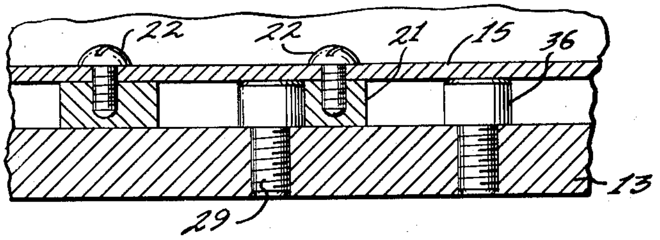
Fig. 3 is an enlarged cross-sectional detail view of the attachment of the plates to the unit and the attachment of the pins to the supporting runners.

Referring, now, to the drawings in which the same reference numerals refer to the same elements, a rack is represented by two vertical U-shaped standards 5 and

2

6, to which are attached guide slides 7 and 8, respectively. Slidable along the guides 7 and 8 are intermediate slides or runners 10 and 11, on which are terminal slidable runners 12 and 13. An electrical unit is represented by a rectangular chassis shown by the outline 15 on the top of which may be mounted electrical elements, such as transformers, tubes, condensers, etc., and to the bottom of which the wiring between the various elements is attached. To the front of the chassis 15, a panel 16 having handles 17 and 18 is attached.

As mentioned above, the invention involves attachments to electrical units and their rack supports which permit the units to be rapidly rotated, removed, and replaced. Thus, to the slides of the chassis 15 and near the center of gravity thereof are grooved plates 20 and 21, the plates being attached to the chassis by any suitable means, such as screws 22. The plates 20 and 21 have one groove each with two substantially right angle sections to form a tongue. At the rear end of the chassis 15 are two additional grooved blocks or plates 24 and 25, which may be attached to the chassis 15 in any suitable manner, such as by screws 26. The chassis 15 is supported on a pair of either press-fitted pins or screw bolts 28 and 29 on the supporting runners 12 and 13, the pins extending into grooves 30 in the plates 20 and 21, and the grooves 30 each having a locking portion 34 at an angle of substantially 90 degrees to the opening or entrance section of the groove. Another pair of pins 31 and 32 on the runners 12 and 13 similar to pins 28 and 29 are adapted to be accommodated in a horizontal slot or groove 33 of the blocks 24 and 25.

Figures 6, 7:
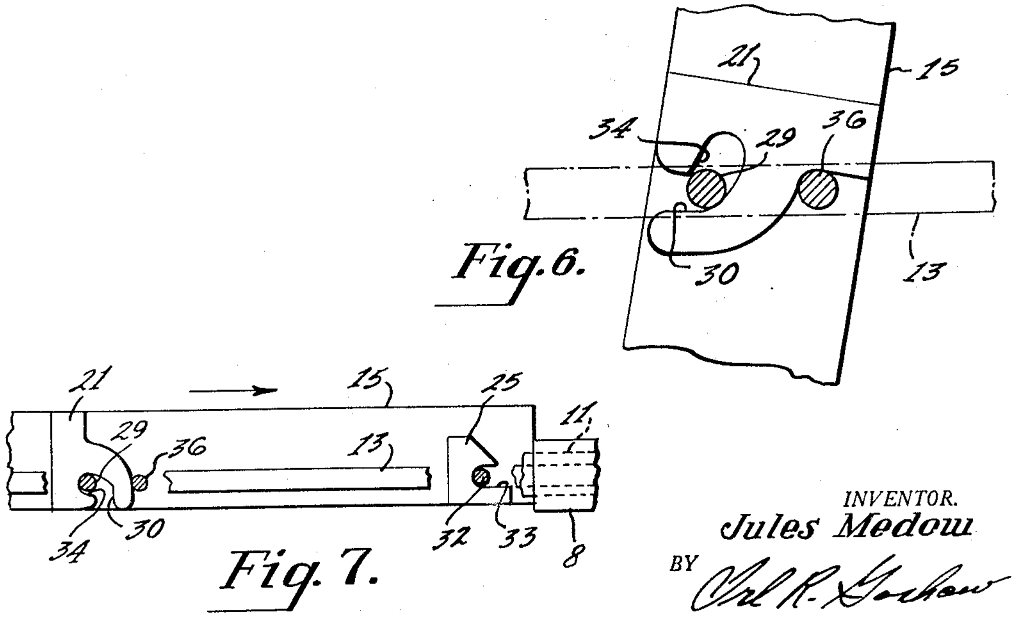
Fig. 6 is a view showing the extreme rotatable or inspection position of the unit.
Fig. 7 is a side elevational view showing the unit locked to its supporting runners.

When the chassis 15 is locked to the runners 12 and 13, the respective positions of the pins 28, 29, 31, and 32 with respect to the blocks 20, 21, 24, and 25 are shown in Fig. 7, the chassis then resting on these pins and being supported thereby. A third pair of pins 35 and 36 are also carried by the runners 12 and 13, these pins resting against the outer, curved portions of the blocks 20 and 21 when the chassis is in locked position, as shown in Fig. 7. However, in unlocked position, as shown in Fig. 2, the pins 31 and 32 are removed from their respective horizontal slots 33 in the blocks 24 and 25 so that the front end of the chassis 15 may be raised and the chassis rotated on the pins 28 and 29.

Figures 4, 5:
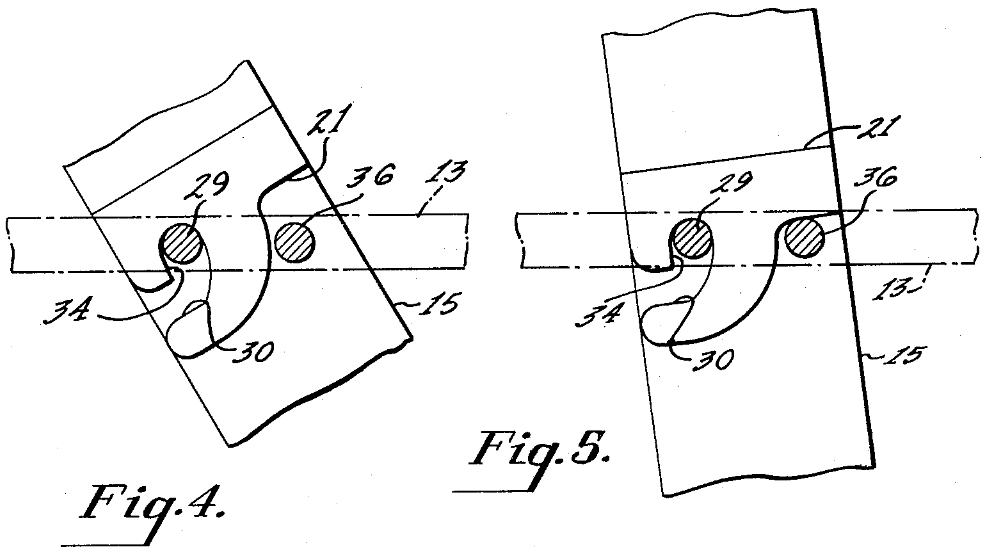
Fig. 4 is a detail view showing a chassis unit partially rotated.
Fig. 5 is a detail view showing another rotated position of the chassis unit with respect to the runners.

As the front end of the chassis is lifted and rotation begins, the pins 28 and 29 move to the rear of the groove 30 into the end of section 34 of the groove 30. Thus, the chassis rotates on pins 28 and 29 and will continue to rotate on these pins to the position shown in Fig. 5, where pins 35 and 36 contact the outer straight side of the blocks 20 and 21. At this point, the chassis will now rotate on the pins 35 and 36, and the pins 28 and 29 will be brought out of the section 34 of the groove 30 until contact is made with the inner surface of the groove 30. This angle of tilt is approximately 10 degrees past the vertical position at which point the heavier weight of the upper section of the chassis will hold it in position as shown in Fig. 6.

Thus, to unlock the chassis from the runners 12 and 13 when the chassis is in locked position as shown in Fig. 7, it is only necessary to move it to the left to the position shown in Fig. 2. The chassis can then be rotated as above explained in connection with Figs. 4, 5, and 6. To return the chassis to its operative position, it is rotated in the reverse direction and moved to the right, as shown in Fig. 7.

It is to be noted that the upper, inner surface of the section 34 of the groove 30, as shown in the figures, slopes downwardly toward the opening of the groove 30. The purpose of this configuration is to urge the chassis into its locked position and to maintain it in this position during operation even though it takes a small amount of extra effort to pull the drawer out of its locked or latched position.

Furthermore, the plates 20 and 21 are of such a configuration that they can be easily milled since only one right angle groove is required in these plates and only a straight groove is required in plates 24 and 25. The plates are easily attachable to the chassis, as described above, while it is only necessary to attach three pins to each of the runners 12 and 13. Not only may the chassis be rotated on the pins and held in inspection position, but the entire chassis may be easily removed from the runners 12 and 13 when the chassis is in its unlatched position as shown in Fig. 2.

Although the plates 20, 21, 24, and 25 have been described as attached to the electrical unit to be rotated, and the pins 28, 29, 31, 32, 35 and 36 have been shown attached to the runners 12 and 13, it is to be understood that the plates could be attached to the runners and the pins could be attached to the unit. The operation would be the same as explained above for both constructions.

I claim:

1. A mounting for locking and rotating an electrical unit on movable runners comprising a pair of plates having a groove in each plate and a curved external surface, said groove having two sections at substantially 90 degress to each other, said plates being attached to the sides of said unit near the center of gravity thereof, a pin in each groove of each plate on which said unit is rotatable a predetermined amount, said pins being attached to said runners, means for holding said unit on said pins, and a second pair of pins contacting said curved surfaces when said first-mentioned pins are in the ends of two of said sections of said grooves.

2. A mounting in accordance with claim 1 in which said means for holding said unit on said pins is a second pair of plates attached to said unit near one end thereof, each of said second pair of plates having a horizontal groove therein, and a second pair of pins movable into said horizontal grooves, said second pair of pins being attached to said runners.

3. A mounting for locking and rotating an electrical unit on movable runners comprising a pair of plates having a groove in each plate, said groove having two sections at substantially 90 degrees to each other, said plates being attached to the sides of said unit near the center of gravity thereof, a pin in each groove of each plate on which said unit is rotatable a predetermined amount, said pins being attached to said runners, means for holding said unit on said pins, said means being a second pair of plates attached to said unit near one end thereof, each of said second pair of plates having a horizontal groove therein, and a second pair of pins movable into said horizontal grooves, said second pair of pins being attached to said runners, said first-mentioned plates having curved surfaces, and a third pair of pins being attached to said runners, said third pair of pins abutting said curved surfaces of said first-mentioned plates, said unit being rotatable on said third pair of pins a predetermined amount.

4. A mounting in accordance with claim 3 in which the bearing surface of the grooves in said first-mentioned plates slopes downwardly from the end of the groove toward the opening of the groove.

5. A locking and rotatable mounting for an electrical unit supported by movable runners comprising a pair of plates attached to the sides of said unit at approximately the center of gravity thereof, said plates having a groove with a normally vertical section and a horizontal connecting section at substantially right angles to said vertical section, one outer edge of each of said plates having a convexly curved surface, a pair of pins attached to said runners and positioned in said grooves, and a second pair of pins attached to said runners and contacting said curved surfaces when said first-mentioned pair of pins are in the end of said horizontal sections of said grooves, said unit being rotatable a predetermined amount on said first-mentioned pair of pins and rotatable a predetermined amount on said second-mentioned pair of pins.

6. A locking and rotatable mounting in accordance with claim 5 in which a second pair of plates is attached to the sides of said unit near one end thereof, said plates having horizontal slots therein, and a second pair of pins is attached to said runners and positionable in the ends of said slots when said first pair of pins are in the ends of the horizontal sections of their respective grooves.

7. A locking and rotatable mounting in accordance with claim 6 in which the horizontal sections of said first-mentioned plates and said slots of said second pair of plates have their axes in alignment, all of said pins having their axes in the same plane.

8. A mounting for locking and rotating an electrical unit on movable runners comprising a pair of plates positioned near the center of gravity of said electrical unit, each plate having a curved external surface and a groove therein with two sections at substantially 90 degrees to each other, a pin in each groove of each plate on which said unit is rotatable a predetermined amount, additional slotted plate and pin means for supporting said unit on said runners, said unit being locked to said runners when said first-mentioned pins are in the ends of said first-mentioned grooves and the pins of said plate and pin means are in the ends of respective slots of said plates of said plate and pin means, and a second pair of pins contacting said curved surfaces when said other pins are in the ends of said grooves and the ends of said slots.

9. A mounting in accordance with claim 8 in which said plate and pin means are a pair of plates and a pair of pins spaced from said first-mentioned plates, said plates of said plate and pin means having slots therein and said pair of pins of said plate and pin means being movable into said slots.

References Cited in the file of this patent

UNITED STATES PATENTS

| | | |
|---|---|---|
| 2,584,173 | Van Fowler | Feb. 5, 1952 |
| 2,749,200 | Kuss | June 5, 1956 |

FOREIGN PATENTS

| | | |
|---|---|---|
| 539,722 | Great Britain | Sept. 22, 1941 |
| 459,780 | Italy | Oct. 4, 1950 |